United States Patent
Koma et al.

(10) Patent No.: US 10,663,621 B2
(45) Date of Patent: May 26, 2020

(54) RETARDATION FILM AND UTILIZATION THEREOF

(71) Applicant: KANEKA CORPORATION, Osaka-shi (JP)

(72) Inventors: Hiroto Koma, Settsu (JP); Ryutaro Mukai, Settsu (JP); Tomohiro Abo, Settsu (JP)

(73) Assignee: KANEKA CORPATION, Osaka-shi (JP)

( * ) Notice: Subject to any disclaimer, the term of this patent is extended or adjusted under 35 U.S.C. 154(b) by 289 days.

(21) Appl. No.: 15/566,960

(22) PCT Filed: Apr. 15, 2016

(86) PCT No.: PCT/JP2016/062098
§ 371 (c)(1),
(2) Date: Oct. 16, 2017

(87) PCT Pub. No.: WO2016/167341
PCT Pub. Date: Oct. 20, 2016

(65) Prior Publication Data
US 2018/0081082 A1    Mar. 22, 2018

(30) Foreign Application Priority Data
Apr. 17, 2015 (JP) .................. 2015-085431

(51) Int. Cl.
*G02B 1/08* (2006.01)
*C08K 9/06* (2006.01)
(Continued)

(52) U.S. Cl.
CPC .................. *G02B 1/08* (2013.01); *C08J 5/18* (2013.01); *C08K 3/36* (2013.01); *C08K 7/18* (2013.01);
(Continued)

(58) Field of Classification Search
CPC .. G02B 1/08; G02B 5/3083; C08J 5/18; C08J 2301/28; C08K 3/36; C08K 7/18; C08K 2201/003; C08L 1/30; C08L 2205/025
(Continued)

(56) References Cited

U.S. PATENT DOCUMENTS 9,309,360 B2 *  4/2016  Wang ................... G02B 5/3083
9,829,603 B2 * 11/2017  Shimatsu ................ G02B 1/11
(Continued)

FOREIGN PATENT DOCUMENTS

| CN | 101107298 A | 1/2008 |
| CN | 102015848 A | 4/2011 |

(Continued)

OTHER PUBLICATIONS

International Preliminary Report on Patentability dated Oct. 26. 2017 in PCT/JP2016/062098.
(Continued)

*Primary Examiner* — Collin X Beatty
(74) *Attorney, Agent, or Firm* — Oblon, McClelland, Maier & Neustadt, L.L.P.

(57) ABSTRACT

The retardation film according to the present invention is characterized by: including a polymer material that includes at least one cellulose derivative which includes specific monomer units: having an in-plane retardation Re(550) of 105-160 nm, reverse wavelength dispersion property, Re(450)/Re(550), of 0.80-0.89, and a thickness of 20-50 μm; and containing inorganic particles. In particular, the present invention exhibits the effect of reducing the photoelastic coefficient.

20 Claims, 1 Drawing Sheet

(51) Int. Cl.
  *C08J 5/18* (2006.01)
  *C08K 3/36* (2006.01)
  *C08K 7/18* (2006.01)
  *C08L 1/30* (2006.01)
  *G02B 5/30* (2006.01)
  *G02F 1/13363* (2006.01)

(52) U.S. Cl.
  CPC ...... *C08K 9/06* (2013.01); *C08L 1/30* (2013.01); *G02B 5/3083* (2013.01); *C08J 2301/28* (2013.01); *C08K 2201/003* (2013.01); *C08K 2201/011* (2013.01); *C08L 2205/025* (2013.01); *G02F 1/13363* (2013.01)

(58) Field of Classification Search
  USPC .................................................. 359/489.07
  See application file for complete search history.

(56) References Cited

U.S. PATENT DOCUMENTS

| | | | | |
|---|---|---|---|---|
| 2002/0018886 | A1* | 2/2002 | Matsufuji | C09D 4/00 428/328 |
| 2005/0181146 | A1* | 8/2005 | Yoneyama | G02B 1/111 428/1.31 |
| 2008/0107829 | A1 | 5/2008 | Oya et al. | |
| 2008/0239488 | A1 | 10/2008 | Asakura et al. | |

FOREIGN PATENT DOCUMENTS

| | | |
|---|---|---|
| JP | 2005-208257 A | 8/2005 |
| JP | 2006-282885 A | 10/2006 |
| JP | 2007-121351 A | 5/2007 |
| JP | 2008-95026 A | 4/2008 |
| JP | 2008-262187 A | 10/2008 |
| JP | 2009-132764 A | 6/2009 |
| JP | 2011-112842 A | 6/2011 |
| JP | 2014-195988 A | 10/2014 |

OTHER PUBLICATIONS

International Search Report dated Jul. 12, 2016 in PCT/JP2016/062098.

Combined Chinese Office Action and Search Report dated Aug. 21, 2019, in Patent Application No. 201680021424.2. 18 pages (with English translation).

* cited by examiner

RETARDATION FILM AND UTILIZATION THEREOF

FIELD

The present invention relates in general to a retardation film and utilization thereof, where the retardation film may be used in an image display device such as a liquid crystal display, an organic EL display device, and the like. More specifically, the present invention relates to retardation films that have increasing in-plane retardation for longer wavelengths and the utilization thereof.

BACKGROUND

Various kinds of retardation films are used to improve the display performance of an image display device, e.g., a liquid crystal display or an organic EL display device. Among these, the retardation films whose in-plane retardation increases toward longer wavelengths (also referred to as "reverse wavelength dispersion films" below) may be applied to a reflective liquid crystal display device, a touch screen panel, or an organic EL as an anti-reflection layer.

When the reverse wavelength dispersion film is used as an anti-reflection layer, the phase difference of the measured wavelength is roughly one quarter of lambda (λ), and preferably the ratio of the in-plane retardation at 450 nm to the in-plane retardation at the 550 nm Re(450)/Re(550) approaches 0.81. Looking at examples of thinning display devices, the reverse wavelength dispersion films used for this purpose should be around 20 μm to 50 μm thick. Various kinds of retardation films that fulfill the aforementioned needs have been disclosed.

Japanese Patent Publication No. 2007-121351 (published May 17, 2007) discloses a reverse wavelength dispersion film composed of cellulose acylate and ethyl cellulose. The retardation films disclosed in Japanese Patent Publication No. 2007-121351 all possess a roughly quarter-wave in-plane retardation and are suitable as an anti-reflection layer.

Japanese Patent Publication No. 2006-282885 (published Oct. 19, 2006) discloses a reverse wavelength dispersion film composed of cellulose acylate and ethyl cellulose. The in-plane retardation of the retardation film disclosed therein must be modified in order for the same to be used as an anti-reflection layer. The film is made thicker in order for the in-plane retardation to be proportional to the film thickness whereby the film is capable of achieving a roughly quarter-wave in-plane retardation.

Japanese Patent Publication No. 2011-112842 (published Jun. 11, 2011) discloses a reverse wavelength dispersion film composed of cellulose acylate and ethyl cellulose. The retardation film disclosed in JP2011-112842A exhibits better retardation capabilities than the retardation films in JP2007-121351A and JP2006-282885A, and is thus capable of providing identical in-plane retardation properties while being thinner than the aforementioned films.

Japanese Patent Number 4892313 (published Apr. 24, 2008) discloses a cellulose derivative with various aromatic and aliphatic acylates with different maximum absorption wavelengths and molar attenuation coefficients as substituents. The retardation film disclosed demonstrates the intended reverse wavelength dispersion property.

Japanese Patent Publication No. 2009-132764 (published Jun. 18, 2009) discloses a cellulose derivative with a large retardation toward the thickness of the film (Rth). The aforementioned film material is an aromatic esterified cellulose ether, with inorganic particles added to serve as a matting agent.

RELATED ART DOCUMENTS

Patent Documents

Patent Document 1: Japanese Patent Publication Number 2007-121351 (published May 17, 2007)
Patent Document 2: Japanese Patent Publication Number 2006-282885 (published Oct. 19, 2006)
Patent Document 3: Japanese Patent Publication Number 2011-112842 (published Jun. 11, 2011)
Patent Document 4: Japanese Patent Number 4892313 (published Apr. 24, 2008)
Patent Document 5: Japanese Patent Publication Number 2009-132764 (published Jun. 18, 2009)

SUMMARY

Technical Problem

As above described, while the films disclosed in JP2007-121351A, JP2006-282885A, JP2011-112842A, and JP4892313B are capable of demonstrating reverse wavelength dispersion, these films are thick with the thinnest thereof at roughly 60 μm. Additionally, although JP2009-132764A [Patent Document 5] discusses inorganic particles there is no description of reverse wavelength dispersion and a photoelastic coefficient. Thus, the existing films described above are not capable of achieving a thin retardation film that is 20 μm to 50 μm thick with excellent reverse wavelength dispersion property and a roughly quarter-wave in-plane retardation. Moreover, retardation films need to have a low photoelastic coefficient so that the film can reduce any mottling that may occur when a stress is applied thereto.

In view of the above, the present invention provides a reverse wavelength dispersion film that is 20 μm to 50 μm thick with excellent reverse wavelength dispersion property and a roughly quarter-wave in-plane retardation, and that has a lower photoelastic coefficient.

Solution to Problem

<1>

A retardation film containing a polymer material composed of at least one type of cellulose derivative including a monomeric unit represented by the following general formula (1), the retardation film having an in-plane retardation Re(550) of 105 nm to 160 nm, a reverse wavelength dispersion property Re(450)/Re(S50) of 0.80 to 0.89, a film thickness of 20 μm to 50 μm, and containing inorganic particles.

[Formula 1]

(Where, $R^1$, $R^2$, and $R^3$ in the general formula (1) are each independently hydrogen, a saturated aliphatic group, an unsaturated aliphatic group, or an aromatic group).

<2>
The retardation film according to <1>, wherein at least one of $R^1$, $R^2$, and $R^3$ of the monomeric unit represented by the general formula (1) for the cellulose derivative is of the aromatics group.
<3>
The retardation film described in <1> or <2>, wherein a sum of the degree of substitution ($D_1$) for the saturated aliphatic group or the unsaturated aliphatic group in the cellulose derivative is 2.00 to 2.70;
 the degree of substitution ($D_2$) of the aromatic group in the cellulose derivative is 0.30 to 1.00;
 the total degree of substitution ($D_3$) of the aromatic group in the polymer material is 0.40 to 0.50; and
 the degree of substitution ($D_1$) and the degree of substitution ($D_2$) satisfy the relationship: $D_1+D_2 \leq 3.0$.
<4>
The retardation film described in any one of <1> to <3>, wherein the aromatic group is an aromatic acyl group.
<5>
The retardation film described in any one of <1> to <4>, wherein the photoelastic coefficient of the retardation film is less than $42.0' \ 10^{-12} \ m^2/N$.
<6>
The retardation film described in any one of <1> to <5>, wherein the inorganic particles contain an unsaturated bond.
<7>
The retardation film described in <6>, wherein the inorganic particles contain an acryloyl group.
<8>
The retardation film described in any one of <1> to <7>, wherein the inorganic particles are 5 parts by weight to 40 parts by weight with respect to the cellulose derivative at 100 parts by weight.
<9>
The retardation film described in any one of <1> to <8>, wherein the inorganic particles contain silica particles.
<10>
The retardation film described in any one of <1> to <9>, wherein the inorganic particles have an average particle diameter of 5 nm to 30 nm.
<11>
The retardation film described in any one of <1> to <10>, wherein the inorganic particles are spherical particles.
<12>
The retardation film described in any one of <1> to <11>, wherein the saturated aliphatic group in the general formula (1) of the cellulose derivative includes an aliphatic alkyl group.
<13>
The retardation film described in <12>, wherein the aliphatic alkyl group is an ethyl group.
<14>
A circular polarizer plate including at least one retardation film described as any of <1> to <13>.
<15>
An image display device including the circular polarizer plate described in <14>.
<16>
A method of manufacturing a retardation film described by any one of <1> to <13>, the method including steps of:
 drawing a production film containing the polymer material at a draw ratio of 20% to 200% to obtain said retardation film.
<17>
The method of manufacturing a retardation film described in <16>, wherein the temperature when drawing the film is in a range of (Tg−30) ° C. to (Tg+30) ° C. of the glass transition temperature of the production film.

Effects

The present invention provides a reverse wavelength dispersion film that is 20 μm to 50 μm thick with excellent reverse wavelength dispersion property and a roughly quarter-wave in-plane retardation, and that has a lower photoelastic coefficient.

DETAILED DESCRIPTION

An embodiment of the present invention is as described below. The present invention is not limited to the configurations described below and may be modified in various ways and remain within the scope of the claims. The technical means disclosed by the different embodiments and working examples may be combined as appropriate with the resulting embodiments and working examples still within the technical scope of the present invention. Note that all the technical papers and patent documents described herein to serve as references. Within this disclosure a numerical range "A to B" is intended to mean "greater than or equal to A and less than or equal to B".

A retardation film according to one embodiment of the present invention contains a polymer material composed of at least one type of cellulose derivative including a monomeric unit represented by the following general formula (1), the retardation film having an in-plane retardation Re(550) of 105 nm to 160 nm, a reverse wavelength dispersion property Re(450)Re(550) of 0.80 to 0.89, a film thickness of 20 μm to 50 μm, and containing inorganic particles.

[Formula 1]

(Where, $R^1$, $R^2$, and $R^3$ in the general formula (1) are each independently hydrogen, a saturated aliphatic group, an unsaturated aliphatic group, or an aromatic group).

Herein, the term "polymer material" signifies the cellulose derivative represented by the general formula (1), which is contained in the retardation film of the present invention. The aforementioned polymer material may be composed of one type of cellulose derivative that includes a monomeric unit represented by the general formula (1), or may be a mixed compound of a plurality of kinds of cellulose derivatives that includes a monomeric unit represented by the general formula (1). The aforementioned polymer material may be composed of one type of cellulose derivative that includes a monomeric unit represented by the general formula (1), or may be a mixed compound of a plurality of kinds of cellulose derivatives that includes a monomeric unit represented by the general formula (1). The retardation film of the present invention may be made up of material other than the above described polymer material.

For instance, a retardation film of the present invention may contain a polymer material composed of a mixture of a plurality of kinds of cellulose derivatives including a monomeric unit represented by the general formula (1), the retardation film having an in-plane retardation Re(550) of 105 nm to 160 nm, a reverse wavelength dispersion property Re(450)/Re(550) of 0.80 to 0.89, a film thickness of 20 μm to 50 μm, and containing inorganic particles.

Each constituent is described below.

(A) Cellulose Derivative

The aforementioned cellulose derivative is derived from replacing some or all of the three hydroxyl groups (—OH) in the β-glucose skeleton, a monomer of cellulose, with an alcohol derivative through various known substitution reactions as illustrated by the general formula (1). In other words, the cellulose derivative contains $OR^2$, $OR^3$ and $OR^1$ at the second, third and sixth positions in the n-glucose skeleton respectively. Here $R^1$, $R^2$, and $R^3$ are each independently hydrogen, a saturated aliphatic group, an unsaturated aliphatic group, or an aromatic group. In the present disclosure the substitution of a hydroxyl group (—OH) for $OR^2$, $OR^3$ or $OR^1$ is also referred to as replacing a hydroxyl group with substituents $R^1$, $R^2$, or $R^3$.

Effective selection of the aforementioned cellulose derivative imparts a production film and the stretched film (the retardation film) produced by stretching said production film with excellent transparency properties (haze, for instance) and optical properties (demonstration of in-plane retardation properties and reverse wavelength dispersion).

The cellulose derivative may be various aliphatic and aromatic esters, alkoxyls, amides, urethanes, carbonates, carbamates, or the like through substitution, and various substituents may be mixed in the same molecule. From the viewpoint of creating a stretched film that exhibits both satisfactory in-plane retardation and reverse wavelength dispersion, the substituents $R^1$, $R^2$, and $R^3$ in the general formula (1) are each independently hydrogen, a saturated aliphatic group, an unsaturated aliphatic group, or an aromatic group; are preferably hydrogen, a saturated aliphatic group or an aromatic group, and more preferably a saturated aliphatic group or an aromatic group. The cellulose derivative preferably includes a backbone that contains a saturated aliphatic group and an aromatic group in the same molecule. Moreover, the above-mentioned saturated aliphatic group is in particular more preferably an aliphatic alkyl group. It can be expected that the retardation properties demonstrated by the stretched film will improve remarkably when the cellulose derivatives includes a backbone that contains an aliphatic alkyl group.

The reverse wavelength dispersion of a retardation film means decreasing retardation within a plane for shorter wavelengths of the light passing through the film (and greater retardation within a plane for longer wavelengths). The reverse wavelength dispersion of retardation in a retardation film (stretched film) obtained by stretching a macromolecular film is due to difference between the refractive index (nx) of the wavelength dispersion in the direction the macromolecular film is stretched, and the refractive index (ny) of the wavelength dispersion in a direction perpendicular the stretch direction.

Figure 1:
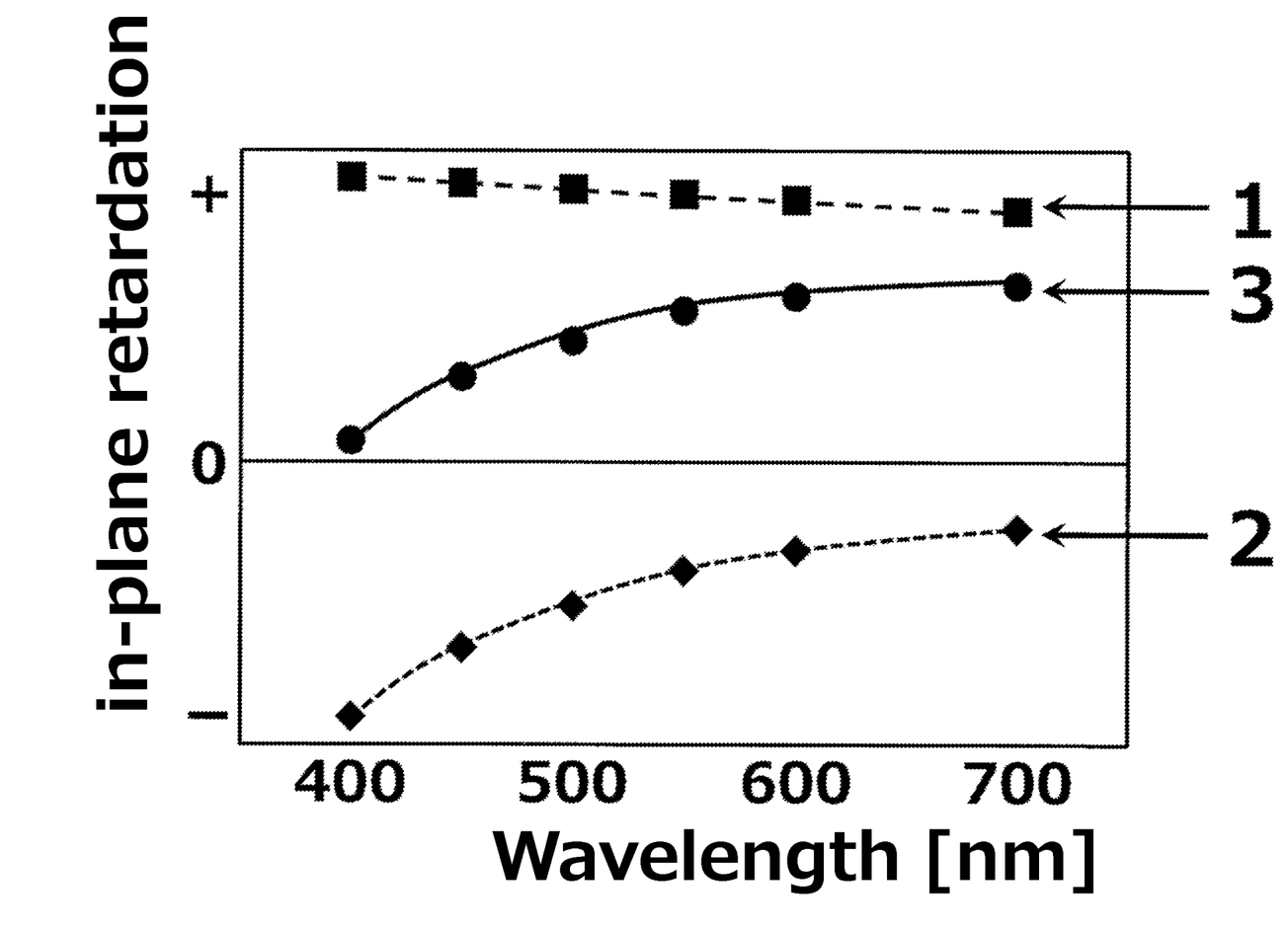
FIG. 1 is for describing the mechanism of the reverse wavelength dispersion property of a retardation film composed of a cellulose derivative.

Here, consider the wavelength dispersion of a retardation film containing a cellulose derivative according to the present invention. For example, the "—H" in at least any one of the hydroxyl groups of the three hydroxyl groups on the n-glucose skeleton in the cellulose derivative is replaced by an ethyl group which is an aliphatic alkyl group to become ethyl cellulose; when stretched along the macromolecular axis ethyl cellulose exhibits orientation-dependent birefringence and expresses positive normal substantially flat wavelength dispersion. The substituents with large polarizability anisotropy identical to an aromatic group possess a negative expression of retardation. The "—H" in at least any one of the hydroxyl groups of the three hydroxyl groups on the β-glucose skeleton in the cellulose derivative may be replaced an aromatic group (e.g., an aromatic acyl group) which has large polarizability anisotropy; here, the cellulose derivative expresses a negative normal wavelength dispersion when the aforementioned aromatic group is introduced orthogonal to the main chain of the aforementioned cellulose. Accordingly, introducing an aromatic group which expresses a negative normal wavelength dispersion property in a direction orthogonal to the main chain in the ethyl cellulose that expresses positive flat wavelength dispersion thereby introduces a difference between the refractive indexes for wavelength dispersion in the along the stretching direction of the macromolecule axis and a direction orthogonal thereto, whereby the resulting cellulose derivative exhibits normal reverse wavelength dispersion.

That is, the present invention replaces an "—H" in at least any one of the hydroxyl groups of the three hydroxyl groups on the l-glucose skeleton in the cellulose derivative with an aliphatic group, and introduces an aromatic group in a direction orthogonal thereto (perpendicular direction) whereby it is believed that a retardation film of the invention produced by stretching the resulting cellulose derivative may express superior reverse wavelength dispersion property.

The aliphatic alkyl group is not particularly limited; however, taking into account imparting the ability to dissolve in a solvent of the cellulose derivative, the ethyl group is particularly preferred.

The unsaturated aliphatic group is not particularly limited, however, for example the group may be an allyl, 2-butenyl, propargyl, or the like.

An aromatic group may replace a "—H" in the three hydroxyl groups (—OH) in the β-glucose skeleton, and is not particularly limited so long as at least one aromatic ring is present. For instance, the aromatic ring may be a benzene ring, or a polycyclic aromatic ring. The polycyclic aromatic ring is not particularly limited, and may be, for instance, a naphthalene ring, anthracene ring, phenanthrene ring, naphthacene ring, perylene ring, or the like. The type of linkage group between the carbon atom in which the aforementioned hydroxyl group is positioned and the aromatic ring is not particularly limited. For instance, this may be an ether linkage, ester linkage, or a urethane linkage.

Even in the aromatic group, an aromatic acyl group is preferable considering the ease of introducing the group into the β-glucose skeleton. Furthermore, the aromatic acyl group demonstrates superior reverse wavelength dispersion. The aromatic acyl group may be, for instance, a substituted or unsubstituted benzoyl group, or a substituted or unsubstituted polycyclic aromatic acyl group or the like. Here the polycyclic aromatic group is represented by an aromatic compound wherein at least two or more aromatic rings share at least two or more of the sp2 carbon in each of the aromatic rings. The substituent is not particularly limited and may be a saturated aliphatic group, an unsaturated aliphatic group, an aromatic group, an alkoxyl group, a carbonyl group, an ester, a halogen atom, or a carbamoyl group, or the like.

The substituent for the substituted benzoyl group may be selected from any of the above provided substituents, with the type, position, and number of substituents not particularly restricted. The saturated aliphatic substituent may be a methyl group, an ethyl group, a propyl group, an isopropyl group, an isobutyl group, a tert-butyl group or the like; the unsaturated aliphatic substituent may be an allyl group, a 2-butenyl group, a propargyl group, or the like; the aromatic substituent may be a phenyl group, a biphenyl group or the like; the alkoxyl group may be a metoxy group, an etoxy group, a butoxy group, or the like; the carbonyl group may be a metoxy carbonyl, and ethoxy carbonyl, or the like; the halogen atom may be a fluorine atom, a chlorine atom, a bromine atom, or an iodine atom; the carbamoyl group may be carbamoyl, metoxy carbamoyl, diethyl carbamoyl, or the like. These substituents may be further replaced, and when two or more substituents are replaced, each of the aforementioned substituents in that case may be the same or may be mutually different substituents.

The aforementioned substituted or unsubstituted polycyclic aromatic acyl group may be more specifically a substituted or unsubstituted naphthoyl group, phenanthrene carbonyl group, anthracene carbonyl group or the like. The carbonyl groups may be substituted at any position in these polycyclic aromatic acyl groups.

A 2-naphthoyl group is particularly preferable as one in the aforementioned aromatic acyl groups that demonstrating superior reverse wavelength dispersion. The 2-naphthoyl may include a substituent on the naphthalene ring structure thereof. The aforementioned substituent is not particularly limited, and specifically, an alkoxyl group, an ester group, an amide, a nitrile, or halogen may be adopted.

Heating and stretching a cellulose derivative normally involves a trade off; however, the aforementioned cellulose derivative is characterized by achieving in-plane retardation and reverse wavelength dispersion that are both satisfactory. Accordingly, it is possible to greatly reduce the size of the film while maintaining these favorable reverse wavelength dispersion and in-plane retardation.

(B) Substitution Reactions in the Cellulose Derivative

Known methods of synthesis may be used as appropriate for substitution reactions used to create the aforementioned cellulose derivative. Why one example is described below, the substitution reactions available for producing the cellulose derivative is not particularly limited. The most simple and easy method involves heating readily available cellulose ether (e.g., ethyl cellulose) and an aromatic acyl group (e.g., 2-naphthoyl chloride) brought together in a pyridine environment, and washing the reactants in water or a solvent with the purpose of aromatic esterification of the hydroxyl group in the ethyl cellulose to obtain the cellulose derivative.

(C) Degree of Substitution in Cellulose

The degree of substitution in the cellulose D (more specifically, $D_1$, $D_2$, $D_3$) represents on average the degree of substitution of the three hydroxyl groups at the second, third and sixth position in the cellulose molecule. D is at most 3. In this case, the three hydroxyl groups which exists at the second, third, and sixth positions in the cellulose molecule may have substantially the same degree of substitution or any one of the three hydroxyl groups at the second, third, and six positions in the cellulose molecule may have a higher degree of substitution while the other the degree of substitution for the other hydroxyl groups are lower.

The degree of substitution ($D_1$) represents the extent to which the "—H" of the three hydroxyl groups at the second, third, and sixth positions in the cellulose molecule is replaced, on average, in the various types of cellulose derivatives in the retardation film by an aliphatic group (saturated aliphatic group or unsaturated aliphatic group). $D_1$ is at most 3. In this case, the three hydroxyl groups which exists at the second, third, and sixth positions in the cellulose molecule may have substantially the same degree of substitution or any one of the three hydroxyl groups at the second, third, and six positions in the cellulose molecule may have a higher degree of substitution while the other the degree of substitution for the other hydroxyl groups are lower. The degree of substitution $D_1$ of the aforementioned aliphatic group represents the number of "O—R (R: aliphatic) groups" generated by replacing the aforementioned aliphatic group in the aforementioned cellulose derivative.

The degree of substitution ($D_2$) represents the extent to which the three hydroxyl groups at the second, third, and sixth positions in the cellulose molecule are replaced, on average, in the various types of cellulose derivatives in the retardation film by an aromatic group. $D_2$ is at most 3. In this case, the three hydroxyl groups which exists at the second, third, and sixth positions in the cellulose molecule may have substantially the same degree of substitution or any one of the three hydroxyl groups at the second, third, and six positions in the cellulose molecule may have a higher degree of substitution while the other the degree of substitution for the other hydroxyl groups are lower. The degree of substitution $D_2$ of the aforementioned aromatic group represents the number of "O—$Ar^o$ ($Ar^o$: aromatic group)" generated by replacing the aforementioned aromatic group in the aforementioned cellulose derivative.

The total degree of substitution ($D_3$) represents the extent to which the three hydroxyl groups at the second, third, and sixth positions in the cellulose molecule are replaced, on average, in the polymer material in the retardation film by an aromatic group. $D_3$ is at most 3. For example, when the polymer material is made up of one type of cellulose derivative, the total degree of substitution ($D_3$) represents the extent to which the three hydroxyl groups in the second, third, and six positions in the cellulose molecule are replaced on average, by an aromatic group, where the maximum value thereof is 3. In contrast, when the polymer material is made up of a mixture of a plurality of types of cellulose derivatives, the total degree of substitution ($D_3$) represents the extent to which the three hydroxyl groups at the second, third, and sixth positions in the cellulose molecule are replaced on average, by an aromatic group overall in the mixture of a plurality of types of cellulose derivatives, where the maximum value thereof is 3.

The values for $D_1$, $D_2$, and $D_3$ may be calculated using known techniques. For example, when the "—H" of the hydroxyl groups in the cellulose molecule are replaced by ethyl groups which are saturated aliphatic groups, the degree of substitution $D_1$ of the ethyl group may be a quantity determined by the method (nuclear magnetic resonance spectroscopy, NMR) described in "Cellulose Communications 6, 73-79 (1999)". The aforementioned publication is incorporated in this disclosure as a reference. The degrees of substitution $D_2$ and $D_3$ may be measured in the same manner, that is, by using nuclear magnetic resonance (NMR) spectroscopy.

As above described the degree of substitution ($D_1$) and the degree of substitution ($D_2$) is intended as the degree of substitution in the various cellulose derivatives that make up the polymer material, while the total degree of substitution ($D_3$) is intended as the degree of substitution for the entire polymer material. More specifically, when the polymer material is composed of a single type of cellulose derivative, the value of the total degree of substitution ($D_3$) in the polymer material is the same as the value for the degree of substitution ($D_2$) for the single type of cellulose derivative.

In contrast, when the polymer material is composed of a mixture of a plurality of types of cellulose derivative, the value of the total degree of substitution ($D_3$) in the polymer material may be determined on the basis of the values of the degrees of substitution ($D_2$) for the various types of cellulose derivatives.

The total degree of substitution ($D_3$), the degree of substitution ($D_1$ and the degree of substitution ($D_2$) are each described below in further detail.

First, the total degree of substitution ($D_3$) is described.

The amount of aromatic groups introduced into the polymer material, in other words, the total degree of substitution ($D_3$), requires an optimum amount. The total degree of substitution ($D_3$) may be 0.40 to 0.50, however in order to exhibit the most suitable reverse wavelength dispersion property, the total degree of substitution ($D_3$) may be 0.41 to 0.50, preferably 0.42 to 0.50, and more preferably 0.42 to 0.48, and most preferably 0.44 to 0.48.

A range of 0.40 to 0.50 for the total degree of substitution ($D_3$) provides a favorable reverse wavelength dispersion property for the retardation film that is obtained, and drastically reduces the likelihood that the cellulose derivative will have a negative birefringence (later described), which is ideal.

Next, the degree of substitution ($D_1$) is described.

The solubility and retardation performance of cellulose ether varies largely with respect to the solvent due to the degree of substitution ($D_1$) in the aliphatic group; however, since the expression of the reverse wavelength dispersion requires a suitable amount of hydroxyls to be unsubstituted in the reaction that introduces the aromatics, the degree of substitution in the aliphatic group is preferably intermediate, $D_3$=2.00-2.70.

When the degree of substitution ($D_1$) of the aliphatic group is 2.00 to 2.70, the solubility of the intended cellulose derivative is satisfactory, and in addition to not being particularly limited with the kind of solvent that may be used, the tendency is for the retardation film obtained to be quite strong. Moreover, the value of $D_1$ is preferably in the range of 2.00 to 2.70 to prevent needing to reduce the amount of aromatic groups introduced without reducing the reverse wavelength dispersion of the retardation film and decreasing the likelihood of reducing the transparency of the aforementioned retardation film when heating and stretching the film while producing the film. Therefore, the degree of substitution ($D_1$) in the aliphatic group may be 2.00 to 2.70 and may be 2.20 to 2.70, or preferably 2.20 to 2.65, more preferably 2.30 to 2.65, and most preferably 2.30 to 2.60.

An aromatic group may be introduced to the hydroxyl group remaining in a cellulose ether skeleton having the aforementioned degree of substitution ($D_1$) in the aliphatic group, whereby in the invention the main chain component (cellulose ether skeleton) and the sub chain component (the aromatic group) are orthogonal in the cellulose derivative. Hereby, an additivity relationship is established between the birefringence of both components where the difference in the wavelength dispersion of the in-plane retardation exhibited due to the birefringence in each of the components thereby brings about reverse wavelength dispersion.

A production film heated and drawn by the appropriate ratio produces positive birefringence in the stretched film; however, a mechanism is required for the stretched film to exhibit positive in-plane retardation. Introducing the appropriate quantity of sub chain components in the cellulose derivative produces a stretched film that tends not to exhibit a negative birefringence and negative in-plane retardation, and normal wavelength dispersion (i.e., the stretched film contains a cellulose derivative having a negative birefringence) without needing to change the maximum birefringence direction of the stretched film; such a stretched film tends to exhibit the desired properties.

Next, the degree of substitution ($D_2$) is described.

An aromatic group can be introduced to the hydroxyl group remaining in the cellulose ether skeleton having the aforementioned degree of substitution ($D_1$) in the aliphatic group in the present invention. In this case, the aromatic group may be introduced to almost all the remaining hydroxyl groups, or maybe introduced to a portion of the remaining hydroxyl groups.

The degree of substitution ($D_2$) is 0.30 to 1.0, and preferably 0.35 to 0.70 from the perspective of making it easier to achieve the desired total degree of substitution ($D_3$).

When the polymer material is composed of a single type of cellulose derivative (in other words, when the value of the total degree of substitution ($D_3$) in the polymer material is the same as the value for the degree of substitution ($D_2$) for the single type of cellulose derivative), the degree of substitution ($D_2$) may be 0.40 to 0.50.

When the polymer material is composed of a single type of cellulose derivative, the value of the total degree of substitution ($D_3$) of the aromatic group in the polymer material is the same as the value for the degree of substitution ($D_2$) of the aromatic group for the single type of cellulose derivative. In contrast, when the polymer material is composed of a mixture of a plurality of types of cellulose derivative, the value of the total degree of substitution ($D_3$) of the aromatic group in the polymer material can be calculated on the basis of the values of the degrees of substitution ($D_2$) of the aromatic groups in the various types of cellulose derivatives. This point is further described below.

The most suitable value of the total degree of substitution ($D_3$) may be calculated via the following computational simulation methods when a single type of cellulose derivative is used. The most suitable value of the total degree of substitution ($D_3$) is calculated via computational simulation when using a single type of cellulose derivative, the in-plane retardation and wavelength dispersion property may be computed on the basis of said value.

More specifically, first, the in-plane retardation and wavelength dispersion property may be measured via experiment for the cellulose derivative (e.g., these are cellulose derivative 1 and 2 used in the working examples and comparative examples in this application) Next, the in-plane retardation and wavelength dispersion property are each measured via separate experiments for the main chain component in said cellulose derivative (cellulose ether skeleton); the in-plane retardation and wavelength dispersion property measured are subtracted from the in-plane retardation and wavelength dispersion property for the aforesaid cellulose derivative, to compute the in-plane retardation and wavelength dispersion property for the sub chain component (aromatic group) included in said cellulose derivative of the experiments. That is, according to the aforementioned, data representing the in-plane retardation and wavelength dispersion property derived from variously configured to main chain components (the cellulose ether skeleton) and data representing the in-plane retardation and wavelength dispersion property derived from variously configured sub chain components (aromatic group) may be collected to create a database.

The data on the in-plane retardation and wavelength dispersion property for a desired cellulose derivative may be computed on the basis of the additive properties of the aforementioned by adding together from the above-described database the data on the in-plane retardation and wavelength dispersion property of a main chain component (cellulose ether skeleton) matching the desired cellulose derivative, and the data on the in-plane retardation and wavelength dispersion property of a sub chain component (aromatic group) matching the desired cellulose derivative.

The above described computational simulation establishes that a total degree of substitution ($D_3$) of 0.46 is most preferable for obtaining the effects of the invention of the present application.

The simplest and most ideal way to achieve a total degree of substitution ($D_3$) of 0.46 for a single cellulose derivative is to use a cellulose ether with a degree of substitution ($D_1$) of 2.54 and to completely replace the remaining hydroxyl groups in the aforesaid cellulose ether with aromatic groups. However, obtaining or synthesizing the aforesaid cellulose ether tends to be complicated and thus the aforementioned method is impractical.

It is theoretically possible to use a cellulose ether with an aliphatic group having a small degree of substitution ($D_1$) (e.g., the cellulose ether in the later-described second synthesis example, $D_1$=2.37) to acquire a single cellulose derivative having a total degree of substitution ($D_3$) of 0.46; however, this requires stopping partway through the aromatic group substitution reaction. In addition to reducing the repeatability of the process, the aforementioned method is also impractical because the absorbency of the film increases due to the hydroxyl groups remaining in the cellulose derivative, which is an undesirable property for an optical film for use with electronic devices.

Given the above, a plurality of types of cellulose derivative may be used to achieve the most suitable total degree of substitution ($D_3$) when acquiring the same through a single cellulose derivative is difficult. For example, the cellulose derivative of a first synthesis example ($D_1$=2.60, $D_2$=0.40) and a cellulose derivative of a second synthesis example ($D_1$=2.37, $D_2$=0.62) may be mixed with an appropriate compounding ratio (weight ratio, and more preferably mole ratio) to thereby achieve a total degree of substitution ($D_3$) of 0.46 thus making it possible for the derivative to express exhibit the optimum reverse wavelength dispersion.

With this method, while it may be difficult for any of the cellulose derivatives to exhibit the most suitable effects independently, the cellulose derivatives have the same skeleton which increases compatibility; the synthesis of each of cellulose derivatives and the film properties may be easily reproduced because almost all replacement is made with the aromatic group. Furthermore, almost no hydroxyl groups remain in the film which is ideal for the film properties.

As already described the total degree of substitution ($D_3$) represents the total degree of substitution of the aromatic group in the cellulose derivative constituting the invention. The total degree of substitution ($D_3$) of the aromatic group is the value of the degree of substitution ($D_2$) of a single type of cellulose derivative when the invention is made up of a single cellulose derivative (i.e., $D_2$=$D_3$). In contrast, the total degree of substitution ($D_3$) of the aromatic group is the sum of the degrees of substitution ($D_2$) of each of the types of cellulose derivatives when the invention is made up of two or more cellulose derivatives.

The value of the total degree of substitution ($D_3$) may be measured using the above mentioned nuclear magnetic resonance (NMR) spectroscopy.

(D) Inorganic Particles

The retardation film of the present invention includes inorganic particles distributed therein.

A portion of the hydroxyl groups (—H) in the polymer material in the present invention is replaced by an aromatic group, and is preferably replaced by an aromatic acyl group. A linkage group (e.g., ether bond, ester bond, or urethane bond or the like) may be formed between the carbon atom coordinated with the aforementioned hydroxyl group and the aromatic ring in the aromatic group; a single bond (e.g., when the aforementioned aromatic group is an aromatic acyl group, the single bond between Ar in the aforementioned aromatic acyl group (Ar—C(=O)—), where Ar represents an aromatic ring) in this linkage group has a high degree of freedom of rotation whereby if a stress is applied to a retardation film obtained from the aforementioned polymer material, the three-dimensional arrangement of the aromatic group changes. Keeping this cause in mind, a retardation film produced using the aforementioned polymer material can be considered to have a high photoelastic coefficient. Despite that, what should be surprising is that the retardation film of the present invention may reduce the photoelastic coefficient thereof by providing the above-mentioned polymer material and incorporating inorganic particles therein.

The inorganic particles may be mixed in after filling around the aromatic group, e.g., filling around the aromatic acyl group to reduce the degree of freedom of rotation about the single bond between $Ar^O$—O, and Ar—C; mixing in the inorganic particles conceivably reduces the photoelastic coefficient of the finally obtained retardation film. The photoelastic coefficient represents the degree of birefringence induced when the stress applied to the film generates anisotropy therein. Thus, in the present invention a low photoelastic coefficient is preferable from the perspective of reducing the likelihood that birefringence will occur.

The inorganic particles that may be used in the present invention are not particularly limited, for example, particles made up of silicon dioxide, titanium dioxide, aluminum oxide, zirconium oxide, calcium carbonate, talc, clay, fired kaolin, fired calcium silicate, hydrated calcium silicate, aluminum silicate, magnesium silicate, calcium phosphate, or the like; and among these, the silica particles where silicon dioxide is the raw material are particularly preferable.

The aforementioned inorganic particles have favorable dispersion property; therefore, it is preferable that the inorganic particles contain unsaturated bonds, and even more preferable if the inorganic particles have surfaces that have in organic bonds from the perspective of reducing the haze in the retardation film obtained.

Preferably inorganic particles containing an acryloyl group, and more preferably inorganic particles with a surface having an acryloyl group serve as the aforementioned inorganic particles containing unsaturated bonds. Among these the aforementioned inorganic particles are preferably silica particles containing an acryloyl group, and more preferably silica particles with a surface having an acryloyl group.

The shape of the aforementioned inorganic particles is not particularly limited as long as the inorganic particles are particle-like. For instance, the aforementioned inorganic particles may have various shapes, e.g., truly spherical, needle-shaped, flat, or irregular; however the aforementioned inorganic particles are more preferably truly spherical particles.

The average particle diameter for the aforementioned inorganic particles is preferably 5 nm to 30 nm, and more preferably 10 nm to 20 nm. The above-mentioned inorganic particles are easier to obtain when the average particle diameter of the inorganic particles is 5 nm or more. In addition, an average particle diameter of 30 nm or less is preferable the haze in the retardation film obtained reduces suitably when the aforementioned inorganic particles are an average particle diameter of 30 nm or less. Note that in the present invention the average particle diameter is computed from the specific surface area (unit: $m^2/g$) obtained by measuring the specific surface area using the BET method and the density (unit: $g/cm^3$) of the inorganic particles around the ambient temperature.

More concrete examples of the inorganic particles that may be used are: product name MIBK-SD from Nissan Chemical Industries, Limited and product name V-8804 from JGC Catalysts and Chemicals Ltd. which may serve as the silica particles having an acryloyl group on the surface; and product name IPS-ST from Nissan Chemical Industries, Limited and product name OSCAL1432M from JGC Catalysts and Chemicals Ltd which may serve as the silica particles with no acryloyl group on the surface.

Preferably, 5 parts by weight to 40 parts by weight of inorganic particles, and more preferably 10 parts by weight to 30 parts by weight may be mixed into the retardation film with the cellulose derivative as 100 parts by weight. Note that when two or more types of cellulose derivatives are contained in the retardation film, the aforementioned cellulose riveted at 100 parts by weight means that the total for all types of cellulose derivatives is 100 parts by weight. The retardation film will have a lower photoelastic coefficient is the amount of the aforementioned inorganic particles contained in the cellulose derivative at 100 parts by weight is 5 parts by weight or more. Furthermore, including 40 parts by weight or less of the inorganic particles in the cellulose derivative at 100 parts by weight is preferable, since this content causes no adverse effects to the optical properties of the retardation film.

(E) In-Plane Retardation: $Re(\lambda)$

The reference $Re(\lambda)$ represents the in-plane retardation in $\lambda$ nm and is defined by the following Equation (1).

$$Re(\lambda)=\Delta Nxy(\lambda) \times d \tag{1}$$

Here, $\Delta Nxy(\lambda)$ is the birefringence in $\lambda$ nm, and d is the thickness of the film. The birefringence referred to here is the difference between the maximum refractive index and the minimum refractive index in the plane of the film.

The retardation film of the present invention may be used in a film anti-reflection layer; in this case, it is preferable that the in-plane retardation of the retardation film is roughly ¼ of the measured wavelength. The retardation Re(550) at 550 nm in particular is 105 nm to 160 nm and preferably 108 nm to 155 nm.

The reverse wavelength dispersion property Re(450)/Re(550) of the retardation film is preferably 0.80 to 0.89 when the retardation film of the present invention is used in an anti-reflection layer. When the in-plane retardation and the wavelength dispersion property are within these ranges, this is reduces the likelihood that a certain specific wavelength band will be insufficiently prevented from reflecting.

(F) Film Thickness

Considering the overall the thickness of the overall layer in which the retardation film of the present invention is used in an anti-reflection layer, the retardation film is 20 µm to 50 µm.

The retardation film may be made thinner so long as the retardation film is able to satisfy the desired in-plane retardation and reverse wavelength dispersion property. However, a thinner film may introduce problems in the strength or ability to handle the film, which must also be considered. In contrast, if a thicker film is produced using a solvent casting method, the time needed for drying the solvent increases and thus adversely affects productivity.

(G) Photoelastic Coefficient

The photoelastic coefficient is a result of dividing the amount of change in the birefringence when a stress is applied to the retardation film and the like by the aforementioned stress. When a retardation film with a high photoelastic coefficient as above-mention is provided to a liquid crystal display device, the aforementioned retardation film, which is adhered to a different type of base material receives stress based on difference with the thermal expansion rates of the base material which creates a large change in retardation. The change in the retardation negatively affects the functions of the liquid crystal display device and the like (e.g., generating color stripes in the display device that incorporates the retardation film); therefore using a retardation film that has a large photoelastic coefficient in a liquid crystal display device or the like is not ideal.

Given the above mentioned points, is preferable that the retardation film of the present invention has a low photoelastic coefficient, and taking into account that the film may be used in an actual product (an image display device and the like such as a liquid crystal display device, an organic EL, and the like) then the photoelastic coefficient is even more preferably less than $42.0 \times 10^{-12}$ $m^2/N$.

(H) Haze

The haze value for a retardation film of the present invention (e.g., a stretched film) is not particularly limited, and may be 2.00% or less, more preferably 1.00% or less, and most preferably 0.50% or less. If the haze value is within the aforementioned range, this increases the total light transmittance of the stretched film thus improving the transparency of the stretched film, which is advantageous and thus preferred.

(I) Other Components

A small amount of additive agents such as a plasticizing agent or thermal stabilizer, an ultraviolet stabilizer, or the like may be added as other components when creating the retardation film of the present embodiment. A plasticizing agent may be added, especially when the retardation film obtained is brittle, to improve processing characteristics, such as drawing. Any desired amount of other components blended into the material as long as the desired optical properties are not lost.

(J) Molecular Weight of the Cellulose Derivative

The molecular weight of the resin (cellulose derivative) used in the present invention is not particularly limited as long as the resin can form a film. For example, in order to obtain a film of superior toughness, the numerical average molecular weight of the resin is preferably 10,000 to 300,000. When using a resin with a natural resin as a raw material, the numerical average molecular weight of the resin is more preferably 20,000 to 200,000 when considering the ease of obtaining the film. A molecular weight at 10,000 or more is preferable from the point of view of improving the strength of the retardation film obtained; whereas, a molecular weight at 300,000 or less ensures the resin is suitably soluble in a solvent, increases the concentration of solid content in a polymer solution, and reduces the amount of solvent that needs to be used during solution casting, and is therefore preferable from a production standpoint.

(K) Methods of Film Production

The retardation film of the present invention is preferably manufactured by drawing a production film that has not been drawn (also referred to as unstretched film). An unstretched production film may be produced according to known methods.

Typical methods for manufacturing unstretched film includes melting and extrusion wherein the melted resin is extruded from a T-shaped die to form the film; and solvent casting wherein a polymer solution into which the resin is melted is casted on a support, heated to dry the solvent and form the film. Solvent casting is the most preferred method considering that I retardation film was relatively precise thickness can be obtained relatively easily thereby.

The solution used on adopting solvent casting is not particularly limited. However, a solvent with a low boiling point is preferable when considering drying efficiency, and more specifically a solvent with a low melting boiling point of 100° C. or less is preferred. More concretely, a ketone-based solvent, or an ester-based solvent may be used. A halogenated hydrocarbon solvent such as dichloromethane tends to dissolve resin material and has a low boiling point and thus is also suitable. In particular dichloromethane has a boiling point of 40° C., which is low and further is highly stable and tends not to inflame during trying; therefore, methylene chloride is particularly preferable for use as a solvent when manufacturing the retardation film of the present invention.

It is preferred that the dichloromethane is used independently as the solvent in the present invention when considering recovery and reuse; however, a solvent mixture may be used wherein dichloromethane is 70% by weight to 99% by weight and an alcohol of no more than three carbon atoms at 1% by weight to 30% by weight.

When a solvent mixture is used, ethyl alcohol is safe as the alcohol on no more than three carbon atoms, and the boiling point thereof is low. Moreover, to avoid an increase in cost, the alcohol of no more than three carbon atoms at 100 parts by weight preferably includes besides ethyl alcohol 1% by weight to 10 parts by weight of other alcohols of no more than three carbon atoms. Isopropyl alcohol is particularly preferred as the alcohol other than ethyl alcohol included on the no more than three carbon atoms when considering stability and boiling point. The solvent discussed here is a solvent having a boiling point lower than the maximum temperature applied to the film during the drying process or the drawing process.

To produce a retardation film that contains inorganic particles, in the present invention the aforementioned inorganic particles are distributed in the aforementioned polymer material; however, the methods for distributing the aforementioned inorganic particles is not particularly limited. For example the aforementioned inorganic particles may be mixed into the aforementioned polymer material, melted, and the molten resin extruded in the aforementioned melting and extruding process, or the inorganic particles may be mixed in after melting the polymer material. For example, in the above-described solvent casting method the aforementioned inorganic particles may be mixed into a solution wherein the polymer material is melted dissolved, and the solution then cast, or the inorganic particles maybe melt mixed into the polymer material whereafter the mixture is dissolved in a solution which is then cast.

(L) Drawing Ratio

In order to obtain the retardation film of the present invention, an unstretched film obtained as previously described is may be drawn using known techniques whereby the unstretched film is preferably drawn and oriented along at least a single axis. A method of heating and drawing uniaxially or biaxially may be adopted as the drawing technique. The retardation film of the present invention is preferably obtained by drawing the same uniaxially along the length thereof. Additionally, because uniaxiality is important when the retardation film of the present invention is to be used as an anti-reflection layer, preferably the free end of the film is drawn uniaxially.

The drawing ratio (X) is expressed in the following Equation 2. Here, L0 is the length of the unstretched film, and L is the length of the stretched film.

$$X=(L-L0)/L0\times 100 \quad (2)$$

The drawing ratio when manufacturing the retardation film of the present invention may be 20% to 200%, and preferably 20% to 150%, more preferably 20% to 100%, and most preferably 30% to 100%.

A drawing ratio of 200% or less prevents the in-plane retardation in the stretched film from greatly exceeding a target value range and also prevents excessive degradation of the strength of the film in a direction perpendicular to the drawing direction due to the polymer material being overly oriented. Additionally, an increase in the drawing ratio reduces the thickness of the film. As can be seen from the aforementioned Equation (1), the in-plane retardation is proportional to the thickness of the film, and therefore, it is preferable that the drawing ratio is not extremely high considering the desire to achieve a certain in-playing retardation.

In contrast, a drawing ratio of 20% or more is preferable as this prevents decreases in the birefringence of the stretched film and prevents increases in the film thickness for film having the desired in-plane retardation.

When producing the retardation film of the present invention, the drawing ratio may be 20% to 60%; when the aliphatic group substituent of the cellulose derivative is an ethyl group, the drawing ratio is preferably 30% to 50%. The aforementioned configuration prevents the film from being damaged and achieves the desired in-plane retardation when the aliphatic group, which is a substituent of the cellulose derivative, is an ethyl group.

(M) Drawing Temperature

The drawing temperature is preferably selected in a range from (Tg−30) ° C. to (Tg+30) ° C. in relation to the glass transition temperature (Tg) of the film. A drawing temperature in a range of (Tg−10) ° C. to (Tg+30) ° C. is particularly preferable.

More specifically, the drawing temperature may be 140° C. to 170° C. and preferably 150° C. to 160° C.

Drawing the film does not whiten the film as long as the drawing temperatures are values within the above described temperature range; the drawing temperatures in this range also reduce phase difference variations in the retardation film obtained, and further simultaneously imparts the most suitable reverse wavelength dispersion, in-plane retardation, and haze value (more specifically, a low haze value).

(N) Solvent Casting

When creating a film via solvent casting, the resin is dissolved in the aforementioned solvent and the polymer solution obtained thereby is casted on a support, and dried to remove the solvents and leave the film.

The viscosity of the resin dissolved in a solvent may be 10 poise to 50 poise, and preferably 15 poise to 50 poise. An ideal support may be a film such as an endless stainless steel belt, a polyamide film, a bi-axially oriented polyethylene-terephthalate film, or the like.

The film may be dried after casting while held on the support, however, if necessary the film may be preliminary dried until being able to support itself, then peeled from the support and further dried.

Floating, tenting or roll transport may be used when drying the film. When using the floating method, the film itself is subject to complex stresses that to generate non-uniform optical properties. When using the tenting method, the distance between the pins or clips used to support both ends of the film must be able to balance the tension required to support the contracting width and the weight of the film as the solvent dries, and thus requires complex control for the expansion and contraction in the width.

Whereas, when using the roll transport method, in principle the tension required to support the film for transport is applied in the direction the film travels (MD direction), and therefore the stress tends to be applied along one direction. Accordingly, the film is preferably dried is most preferably dried using the role conveyor method. Additionally, drying the solvent in a low humidity environment ensures that the film does not absorb moisture and is thus an effective means of acquiring a retardation film of the present invention with a high level of mechanical strength and transparency.

The surface of the retardation film of the present invention may be given a hard coat, optical tuning, or anti-static surface treatment or the like. The surface of the retardation film may also be provided with a transparent conductive layer so that the same may be used as a touchscreen panel or a magnetic shield.

(O) Circular Polarizer Plate and Image Display Device

The retardation film of the present invention may be used as an anti-reflection layer. A circular polarizer plate that includes a retardation film of the present invention may function as one form of an anti-reflection layer. The circular polarizer plate is an optical element that converts unpolarized light into circularly polarized light. The circular polarizer plate may be configured as a laminate wherein the absorption axis of the polarizing element and the slow axis of the retardation film of the present invention are adhered together to form an angle of 45°. The adhesive layer created at this time and a protective film for the polarizing element may be any desired configuration. This anti-reflection layer may be effectively used in an image display device such as a liquid crystal display device, an organic EL, and the like. The retardation film of the present invention may also serve as a protective film for the polarizing element.

(P) Manufacturing the Retardation Film

A method of manufacturing a retardation film according this embodiment of the present invention involves a polymer material composed of at least one type of cellulose derivative including a monomeric unit represented by the following general formula (1), the retardation film having an in-plane retardation Re(550) of 105 nm to 160 nm, a reverse wavelength dispersion property Re(450)/Re(550) of 0.80 to 0.89, a film thickness of 20 μm to 50 μm, and haze of less than or equal to 2.00%;

the method of manufacturing the retardation film characterized by containing inorganic particles.

[Formula 1]

(Where, $R^1$, $R^2$, and $R^3$ in the formula are each independently hydrogen, a saturated aliphatic group, an unsaturated aliphatic group, or an aromatic group); and The method of manufacturing the retardation film characterized by drawing a production film containing the polymer material.

The drawing temperature during the aforementioned drawings step may be selected in a range from (Tg−30) ° C. to (Tg+30) ° C., and may be particularly selected in a range from (Tg−10) ° C. to (Tg+30) ° C. as above described. More specifically, the drawing temperature may be 140° C. to 170° C. and preferably 150° C. to 160° C.

At this point, during the drawings the aforementioned drawing step, the production film that contains the aforementioned polymer material may have a drawing ratio of 20% to 200%, and preferably drawn to 20% to 150%, more preferably drawn to 20% to 100%, most preferably drawn to 30% to 100% and may be especially drawn 30% to 50%.

The details for methods of producing a retardation film according to this embodiment are already provided in the above mentioned sections "(K) Methods of Film Production", "(L) Drawing Ratio", "(M) Drawing Temperature" and "(N) Solvent Casting the Base Material" and thus those descriptions are omitted.

WORKING EXAMPLES

<1. Measurement Techniques>

The characteristic values and the like described the present disclosure were obtained via the following evaluation techniques.

(1) In-Plane Retardation and Reverse Wavelength Dispersion Property

The in-plane retardation and wavelength dispersion were measured using an OPTIPRO manufactured by SHINTEC Co., Ltd.

(2) Thickness

The thickness was measured using an electronic micrometer manufactured by Anritsu.

(3) Glass Transition Temperature (Tg)

The glass transition temperature was measured using a TMA-4000SA thermo-mechanical analyzer manufactured by Bruker AXS. More specifically, a film was cut to 5 mm×20 mm and the temperature of the film was allowed to rise at 3° C./min while tensile load of 3 g was applied thereto all under a nitrogen atmosphere. The real measurements obtained were graphed (with temperature data plotted along the X-axis and the actual measurement values of the lengthening plotted along the Y-axis); Tg was defined as the intersection of two lines connecting before and after the film begins to stretch, and said Tg calculated.

(4) Photoelastic Coefficient

The photoelastic coefficient was measured using a KORBA manufactured by Oji Scientific Instruments. More specifically, a tensile load was applied to a 15 mm×60 mm cut of the film and the change in retardation measured when the tensile load changed from 0 g to 1100 g in increments of 100 g; the real measurements obtained were graphed (with stress calculated from the tensile load value plotted along the X-axis and the birefringence calculated from the actual retardation measured and the film thickness plotted along the Y-axis). The photoelastic coefficient was defined as the slope of a straight line on the graph, and said photoelastic coefficient calculated.

(5) Haze

The haze was measured using a haze meter (HZ-V3 manufactured by Suga Test Instruments Co., Ltd).

<2. Cellulose Derivative>

Concrete methods of synthesizing the cellulose derivative are described below.

(First Synthesis Example)(Cellulose Derivative 1: Ethylcellulose-2-Naphthoate Synthetic: $D_1$=2.60, $D_2$=0.40)

After measuring ethyl cellulose (11.74 g: 50 mmol; $D_1$=2.60) into a four-port reactor as the cellulose ether, a magnetic stirring rod was introduced and a Dimroth condenser, drip funnel, thermocouple, and nitrogen filled balloon were attached to the four-port reactor and nitrogen purged from inside the four-port reactor.

After introducing pyridine (201 ml: 2500 mmol), the magnetic stirrer was operated at 2000 rpm under 80° C. heat until the ethyl cellulose dissolved.

2-naphthoyl chloride (47.7 g: 250 mmol) manufactured by Wako Pure Chemical Industries was dissolved in 100 ml of 1,4-dioxane, and the dissolution dripped after confirming that the solution was transparent. Stirring was performed for 8 h post drip, whereafter the reacted solution was dripped into 500 ml of methanol and stirred to produce a uniform solution. This uniform solution was dripped into 1 L of pure water and stirred to thereby generate a white precipitate; after filtering said white precipitate, the precipitate was stirred and again washed using 1 L of pure water.

Next, the white precipitate was washed in 500 ml of methanol and after carrying out the filtering step two more times, the white precipitate was vacuum dried for 5 h in a vacuum oven at 60° C. whereby the intended cellulose derivative was obtained in powdered form (molar yield 87%, 12.87 g).

The resin was analyzed using the 400 MHz 1H-NMR manufactured by Bruker to verify that the intended cellulose derivative was obtained, and measurement confirmed that the degree of substitution ($D_2$) of the naphthoyl was 0.40.

(Second Synthesis Example)(Cellulose Derivative 2: Ethylcellulose-2-Naphthoate Synthetic: $D_1$=2.37, $D_2$=0.62)

The method of synthesis used was identical to the first synthesis example except for using ethyl cellulose (11.42 g: 50 mmol; $D_1$=2.37) as the cellulose ether, and the intended cellulose derivative was obtained in powdered form (molar yield 93%, 15.11 g).

The resin was analyzed using the 400 MHz 1H-NMR manufactured by Bruker to verify that the intended cellulose derivative was obtained, and measurement confirmed that the degree of substitution ($D_2$) of the naphthoyl was 0.62.

<3. Production Film>

A method of manufacturing the production film using the above-mentioned cellulose derivatives is described below.

(First Production Film Example) (Manufacturing Film 1: $D_3$=0.40)

The resin purified from the first synthesis example was dissolved in super dehydrated dichloromethane (Wako Pure Chemical Industries) to produce a 1% by weight dilution; the dilution was filtered under reduced pressure through a hardened filter paper No. 4 from Advantech Co., Ltd. to filter out insoluble matter, whereafter the dilution was concentrated in an evaporator to obtain a 4% by weight polymer solution.

Silica particles (Product Name MIBK-SD manufactured by Nissan Chemical Industries, Ltd.: particle diameter 10 nm) having an acryloyl group on the surface were added to the polymer solution at 10 parts by weight to the 100 parts by weight of the cellulose derivative resin to obtain an application liquid.

The application liquid was flawed and drawn on a biaxially oriented polyethylene-terephthalate film (written below as 'PET film'), whereafter the application liquid was applied using a bar coater to create a film roughly 40 μm to 50 μm thick after drying.

The dichloromethane was removed by drying in an 80° C. dry atmosphere for five minutes, a 100° C. dry atmosphere for five minutes, and a 120° C. dry atmosphere for 10 minutes. After drying, the film obtained was peeled from the PET film. The film obtained was secured in a 500 mm×300 mm aluminum frame dried for 15 minutes in 110° C. dry atmosphere, to remove the remaining dichloromethane and thus obtain the Film 1. The glass transition temperature of the Film 1 was 137° C. when measured.

(Second Production Film Example) (Manufacturing Film 2: $D_3$=0.40)

The Film 2 was obtained similarly to the production film of the first example, except that the silica particles containing an acryloyl group on the surface were added at 20 parts by weight in relation to the 100 parts by weight of the cellulose derivative resin. The glass transition temperature of the Film 2 was 137° C. when measured.

(Third Production Film Example) (Manufacturing Film 3: $D_3$=0.40)

The Film 3 was produced similarly to the production film of the first example, except that the silica particles containing an acryloyl group on the surface were added at 30 parts by weight in relation to the 100 parts by weight of the cellulose derivative resin. The glass transition temperature of the Film 3 was 137° C. when measured.

(Fourth Production Film Example) (Manufacturing Film 4: $D_3$=0.44)

The Film 4 was obtained similarly to the production film of the second example, except that the resin used ($D_3$=0.44) was a mixture of the resin produced from the first synthesis example ($D_2$=0.40) and the resin produced from the second synthesis example ($D_2$=0.62) at a weight ratio of 8:2. The glass transition temperature of the Film 4 was 139° C. when measured.

(Fifth Production Film Example) (Manufacturing Film 5: $D_3$=0.40)

The Film 5 was produced similarly to the production film of the second example, except that silica particles having no acryloyl group on the surface thereof (product name OSCAL1432M from JGC Catalysts and Chemicals Ltd.; particle diameter 10 nm) were used. The glass transition temperature of the Film 5 was 145° C. when measured.

(Sixth Production Film Example) (Manufacturing Film 6: $D_3$=0.40)

The Film 6 was produced similarly to the production film of the first example, except that no silica particles were added. The glass transition temperature of the Film 6 was 145° C. when measured.

(Seventh Production Film Example) (Manufacturing Film 7: $D_3$=0.44)

The Film 7 was obtained similarly to the production film of the first example, except that the resin used ($D_3$=0.44) was a mixture of the resin produced from the first synthesis example ($D_2$=0.40) and the resin produced from the second synthesis example ($D_2$=0.62) at a weight ratio of 8:2 and no silica particles were added. The glass transition temperature of the Film 7 was 145° C. when measured.

<4. Stretched Film>

A method of manufacturing the stretched film using the above mentioned production film is described below.

Working Example 1

The free end of the Film 1 is drawn uniaxially by 50% at 150° C. A 50 mm×40 mm section of film is cut and measured from the center of the stretched film. The results thereof are depicted in Table 1.

Working Example 2

The free end of the Film 2 is drawn uniaxially by 50% at 150° C. A 50 mm×40 mm section of film is cut and measured from the center of the stretched film. The results thereof are depicted in Table 1.

Working Example 3

The free end of the Film 3 is drawn uniaxially by 50% at 150° C. A 50 mm×40 mm section of film is cut and measured from the center of the stretched film. The results thereof are depicted in Table 1.

Working Example 4

The free end of the Film 1 is drawn uniaxially by 50% at 150° C. A 50 mm×40 mm section of film is cut and measured from the center of the stretched film. The results thereof are depicted in Table 1.

Working Example 5

The free end of the Film 1 is drawn uniaxially by 50% at 155° C. A 50 mm×40 mm section of film is cut and measured from the center of the stretched film. The results thereof are depicted in Table 1.

Comparative Example 1

The free end of the Film 6 is drawn uniaxially by 50% at 155° C. A 50 mm×40 mm section of film is cut and measured from the center of the stretched film. The results thereof are depicted in Table 1.

Comparative Example 2

The free end of the Film 7 is drawn uniaxially by 50% at 155° C. A 50 mm×40 mm section of film is cut and measured from the center of the stretched film. The results thereof are depicted in Table 1.

TABLE 1

| | | Working Example 1 | Working Example 2 | Working Example 3 | Working Example 4 | Working Example 5 | Comparative Example 1 | Comparative Example 2 |
|---|---|---|---|---|---|---|---|---|
| Cellulose Derivative 1 | Alkoxyl | EtO | EtO | EtO | EtO | EtO | EtO | EtO |
| | Aromatic Acyl | 2-Naphthoyl | 2-Naphthoyl | 2-Naphthoyl | 2-Naphthoyl | 2-Naphthoyl | 2-Naphthoyl | 2-Naphthoyl |
| | $D_1$ | 2.60 | 2.60 | 2.60 | 2.60 | 2.60 | 2.60 | 2.60 |
| | $D_2$ | 0.40 | 0.40 | 0.40 | 0.40 | 0.40 | 0.40 | 0.40 |
| | $D_1 + D_2$ | 3.00 | 3.00 | 3.00 | 3.00 | 3.00 | 3.00 | 3.00 |
| Cellulose Derivative 2 | Alkoxyl | — | — | — | EtO | — | — | EtO |
| | Aromatic Acyl | — | — | — | 2-Naphthoyl | — | — | 2-Naphthoyl |
| | $D_1$ | — | — | — | 2.37 | — | — | 2.37 |
| | $D_2$ | — | — | — | 0.62 | — | — | 0.62 |
| | $D_1 + D_2$ | — | — | — | 2.99 | — | — | 2.99 |
| Cellulose Derivative 1: Cellulose Derivative 2 (Parts by Weight) | | Derivative 1 Only | Derivative 1 Only | Derivative 1 Only | 8:2 | Derivative 1 Only | Derivative 1 Only | 8:2 |
| Total Degree of Substitution $D_3$ for Aromatic Acyl Group | | 0.40 | 0.40 | 0.40 | 0.44 | 0.40 | 0.40 | 0.44 |
| Silica Particles | Acryloyl | Yes | Yes | Yes | Yes | No | — | — |
| | Particle Diameter (nm) | 10 | 10 | 10 | 10 | 10 | — | — |
| | Quantity of Additives (Parts by weight) | 10 | 20 | 30 | 20 | 20 | — | — |
| | Production Film | Film 1 | Film 2 | Film 3 | Film 4 | Film 5 | Film 6 | Film 7 |
| | Photoelastic Coefficient ($\times 10^{-12}$ m²/N) | 38.5 | 38.1 | 37.9 | 39.6 | 41.9 | 45.7 | 47.3 |
| | Tg (° C.) | 137 | 137 | 137 | 139 | 145 | 145 | 145 |
| Drawing Parameters | Temperature (° C.) | 150 | 150 | 150 | 150 | 155 | 155 | 155 |
| | Ratio (%) | 50 | 50 | 50 | 50 | 50 | 50 | 50 |
| Stretched Film | Thickness (μm) | 45 | 48 | 50 | 50 | 40 | 45 | 40 |
| | Re(550) (nm) | 153 | 139 | 117 | 108 | 151 | 160 | 144 |
| | Re(450)/Re(550) | 0.85 | 0.85 | 0.84 | 0.8 | 0.87 | 0.89 | 0.84 |
| | Haze (%) | 1.10 | 0.45 | 0.48 | 1.13 | 27.97 | 1.95 | 2.41 |

(Conclusion)

The photoelastic coefficients of the retardation films produced through the Working Examples 1 to 5 are compared to the photoelastic coefficients of the retardation films produced through the Comparative Examples 1 to 2. The photoelastic coefficients of the retardation films produced through Working Examples 1 to 5 are lower than the photoelastic coefficients of the retardation films produced through the Comparative Examples 1 to 2. It can therefore be understood that adding silica particles, which are inorganic particles, reduces the photoelastic coefficient of the retardation film.

The haze of the retardation films produced through Working Examples 1 to 4 is compared to the haze of the retardation film produced through Working Example 5. The haze of the Working Example 5 is quite low compared to the haze of the Working Examples 1 to 4. It can therefore be understood that the unsaturated bonds (acryloyl group) contained in the inorganic particles that are added during production improve the dispersion property of the aforementioned inorganic particles and reduces the haze in the retardation film obtained.

INDUSTRIAL APPLICABILITY

The present invention may be used in an image display device such as a liquid crystal display device, an organic EL display device, and the like.

REFERENCE NUMERALS

1. Positive flat wavelength dispersion (property of main skeleton)
2. Negative of normal wavelength dispersion (properties from introduced chain)
3. Positive reverse wavelength dispersion (intended property)

What is claimed is:

1. A retardation film, comprising:
   a polymer material including at least one cellulose derivative having a monomeric unit of formula (1), where $R^1$, $R^2$, and $R^3$ in the formula (1) are each independently hydrogen, an aliphatic alkyl group or an aromatic acyl group; and
a plurality of inorganic particles,
wherein the retardation film has an in-plane retardation Re(550) of 105 nm to 160 nm, a reverse wavelength dispersion property Re(450)/Re(550) of 0.80 to 0.89, and a thickness of 20 μm to 50 μm,
the cellulose derivative has a total degree of substitution D1 of 2.00 to 210 for substitution by an aliphatic alkyl group, and a degree of substitution D2 of 0.30 to 1.00 for substitution by an aromatic acyl group, satisfying D1+D2≤3.0 in the cellulose derivative, and
the polymer material has a total degree of substitution D3 of 0.40 to 0.50 for substitution by an aromatic acyl group in the polymer material.

2. The retardation film of claim 1, wherein at least one of $R^1$, $R^2$, and $R^3$ in the formula (1) is an aromatic acyl group.

3. The retardation film of claim 1, wherein the retardation film has a photoelastic coefficient of less than $42.0 \times 10^{-12}$ m$^2$/N.

4. The retardation film of claim 1, wherein the inorganic particles comprise an inorganic material having an unsaturated bond.

5. The retardation film of claim 1, wherein the inorganic particles comprise an inorganic material having an acryloyl group.

6. The retardation film of claim 1, wherein the inorganic particles are included in an amount of from 5 parts by weight to 40 parts by weight with respect to 100 parts by weight of the cellulose derivative.

7. The retardation film of claim 1, wherein the inorganic particles comprise silica particles.

8. The retardation film of claim 1, wherein the inorganic particles have an average particle diameter of 5 nm to 30 nm.

9. The retardation film of claim 1, wherein the inorganic particles are spherical particles.

10. The retardation film of claim 1, wherein the aliphatic alkyl group is an ethyl group.

11. The retardation film of claim 1, wherein the at least one cellulose derivative comprises a plurality of cellulose derivatives.

12. The retardation film of claim 11, wherein each of the cellulose derivatives has the total degree of substitution $D_1$ of 2.00 to 2.70 for substitution by an aliphatic alkyl group, and the degree of substitution $D_2$ of 0.30 to 1.00 for substitution by an aromatic acyl group, satisfying $D_1+D_2 \leq 3.0$ in each of the cellulose derivatives.

13. The retardation film of claim 11, wherein each of the cellulose derivatives has the total degree of substitution $D_1$ of 2.30 to 2.60 for substitution by an aliphatic alkyl group, and the degree of substitution $D_2$ of 0.35 to 0.70 for substitution by an aromatic acyl group, satisfying $D_1+D_2 \leq 3.0$ in each of the cellulose derivatives, and the polymer material has the total degree of substitution $D_3$ of 0.44 to 0.48 for substitution by an aromatic group in the polymer material.

14. A circular polarizer plate, comprising:
   one or more of the retardation film of claim 1.

15. An image display device, comprising:
   the circular polarizer plate of claim 14.

16. A method of manufacturing the retardation film of claim 1, comprising:
   drawing a production film comprising the polymer material at a draw ratio of 20% to 200%.

17. The method of claim 16, wherein the drawing is conducted at a temperature in a range of from (Tg−30) ° C. to (Tg+30) ° C., where Tg is a glass transition temperature of the production film.

18. The retardation film of claim 1, wherein at least one of $R^1$, $R^2$, and $R^3$ is an aliphatic alkyl group, and at least one of the other two of $R^1$, $R^2$, and $R^3$ is an aromatic acyl group.

19. The retardation film of claim 1, wherein at least one of $R^1$, $R^2$, and $R^3$ in the formula (1) is an aromatic acyl group, which is a substituted or unsubstituted naphthoyl group, a substituted or unsubstituted phenanthrene carbonyl group, or a substituted or unsubstituted anthracene carbonyl group.

20. The retardation film of claim 19, wherein at least one of $R^1$, $R^2$, and $R^3$ in the formula (1) is an aliphatic alkyl group, which is an ethyl group.

* * * * *

UNITED STATES PATENT AND TRADEMARK OFFICE
CERTIFICATE OF CORRECTION

PATENT NO. : 10,663,621 B2
APPLICATION NO. : 15/566960
DATED : May 26, 2020
INVENTOR(S) : Hiroto Koma et al.

It is certified that error appears in the above-identified patent and that said Letters Patent is hereby corrected as shown below:

On the Title Page

Item (73), the Assignee's name is incorrect. Item (73) should read:
-- (73) Assignee: KANEKA CORPORATION, Osaka-shi (JP) --

Signed and Sealed this
Fourth Day of August, 2020

Andrei Iancu
*Director of the United States Patent and Trademark Office*